United States Patent
Tokoro et al.

(10) Patent No.: US 7,689,359 B2
(45) Date of Patent: Mar. 30, 2010

(54) RUNNING SUPPORT SYSTEM FOR VEHICLE

(75) Inventors: Setsuo Tokoro, Susono (JP); Kyoichi Abe, Susono (JP); Koji Suzuki, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 767 days.

(21) Appl. No.: 10/587,322

(22) PCT Filed: Jan. 21, 2005

(86) PCT No.: PCT/IB2005/000149
§ 371 (c)(1),
(2), (4) Date: Jul. 26, 2006

(87) PCT Pub. No.: WO2005/080119
PCT Pub. Date: Sep. 1, 2005

(65) Prior Publication Data
US 2007/0168128 A1    Jul. 19, 2007

(30) Foreign Application Priority Data
Jan. 28, 2004 (JP) .............................. 2004-020307
Jul. 8, 2004 (JP) .............................. 2004-202401

(51) Int. Cl.
*B60K 31/00* (2006.01)
*G01S 17/93* (2006.01)
*G06F 19/00* (2006.01)

(52) U.S. Cl. ................ 701/301; 701/41; 701/46; 340/435; 348/148

(58) Field of Classification Search ................ 701/301, 701/41, 96; 340/435, 932.2; 348/148, 135
See application file for complete search history.

(56) References Cited

U.S. PATENT DOCUMENTS 5,901,806 A * 5/1999 Takahashi .................... 180/170

(Continued)

FOREIGN PATENT DOCUMENTS

DE    100 24 227    5/2000

(Continued)

OTHER PUBLICATIONS

International Search Report.

(Continued)

*Primary Examiner*—Tan Q Nguyen
(74) *Attorney, Agent, or Firm*—Finnegan, Henderson, Farabow, Garrett & Dunner, LLP

(57) ABSTRACT

There is provided a running support system for a vehicle, which supports running of a vehicle by using a radar and image recognition means as obstacle detecting means, and in which appropriate support control based on a result of detection performed by each control means is set. A result of obstacle detection performed by a millimeter wave radar (21) is checked against a result of obstacle detection performed by image recognition means (22). Then, a starting condition for the running support control is changed depending on whether an obstacle has been detected by both the millimeter wave radar (21) and the image recognition means (22), or an obstacle has been detected by only one of the millimeter wave radar (21) and the image recognition means (22). Thus, the control support is performed based on an inattentive condition of a driver.

18 Claims, 6 Drawing Sheets

U.S. PATENT DOCUMENTS

| | | |
|---|---|---|
| 6,580,385 B1 | 6/2003 | Winner et al. |
| 7,012,560 B2 * | 3/2006 | Braeuchle et al. ............. 342/70 |
| 7,051,827 B1 * | 5/2006 | Cardinal et al. ............. 180/174 |
| 7,379,815 B2 * | 5/2008 | Kobayashi et al. .......... 701/300 |
| 2003/0033082 A1 * | 2/2003 | Yanagidaira et al. ........ 701/207 |

FOREIGN PATENT DOCUMENTS

| | | |
|---|---|---|
| DE | 101 35 742 | 7/2001 |
| EP | 0 952 459 | 3/1999 |
| JP | 03-224858 | 10/1991 |
| JP | 07-257301 | 10/1995 |
| JP | 11 139229 | 5/1999 |
| JP | 11-139229 | 5/1999 |
| JP | 11-175898 | 7/1999 |
| JP | 2003-205805 | 7/2003 |
| WO | WO 00/73818 | 12/2000 |
| WO | WO 02/076781 | 10/2002 |

OTHER PUBLICATIONS

Written Opinion by the ISA.

* cited by examiner

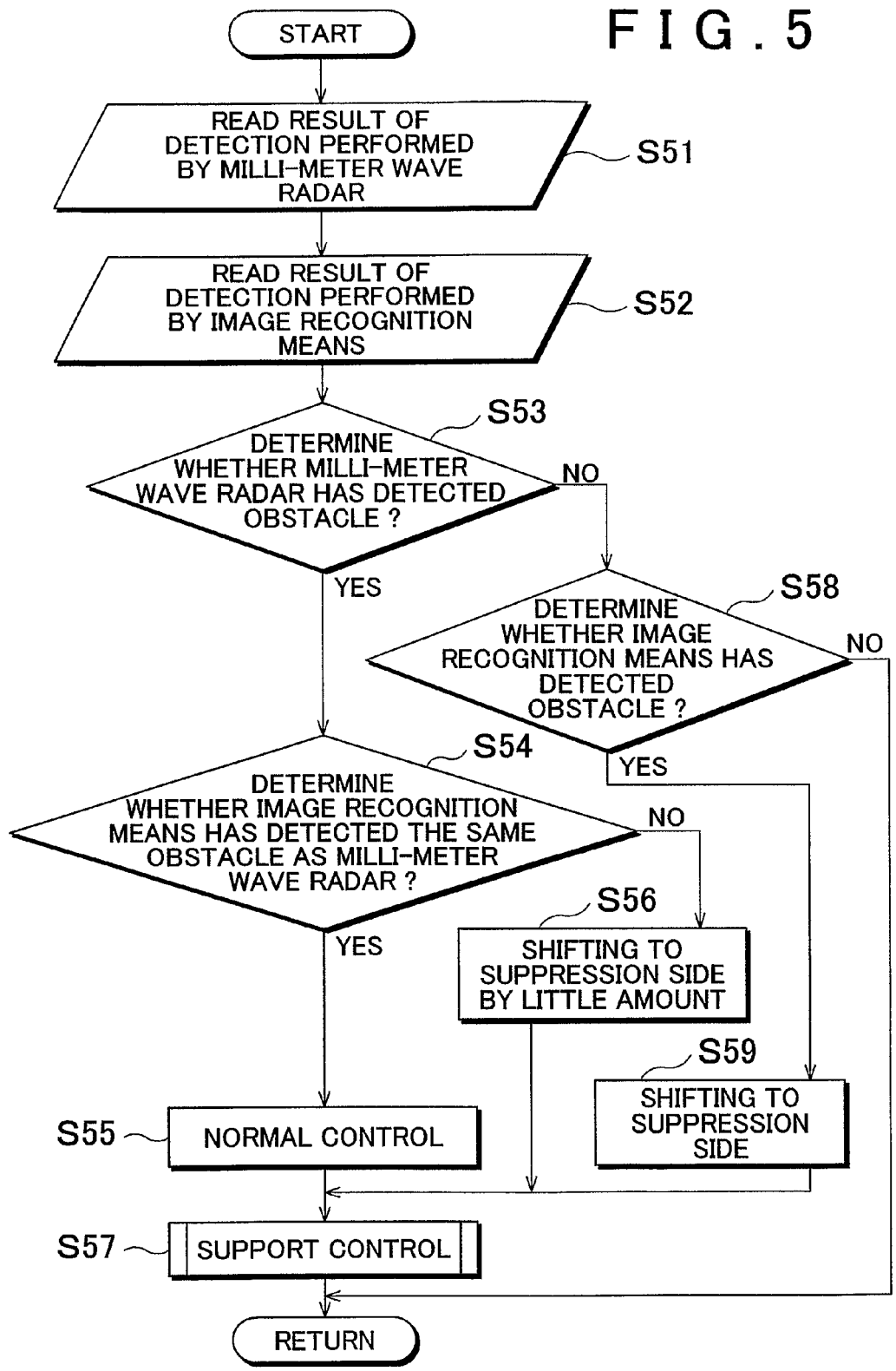

RUNNING SUPPORT SYSTEM FOR VEHICLE

BACKGROUND OF THE INVENTION

1. Field of the Invention

The invention relates to a running support system for a vehicle, which detects an object near a vehicle, and which supports running of the vehicle according to a result of the detection. More particularly, the invention relates to a running support system for a vehicle, which includes two types of object detecting means having different detecting methods, that are, a radar and image recognition means, and which supports running of the vehicle by incorporating a result of determination whether a driver is performing inattentive driving into results of detection performed by the two types of object detecting means.

2. Description of the Related Art

Japanese Patent Laid-Open Publication No. 11-139229 discloses a running support system for a vehicle, which detects an obstacle and the like on a road on which the vehicle is running, determines whether a driver is performing inattentive driving, generates an alarm according to a result of the detection, and the like, thereby supporting the driver, for example, in an operation for avoiding danger. Examples of a technology for detecting an obstacle on a road on which a vehicle is running are a radar system using a laser, ultrasound, infrared light or the like (e.g., a sonar system), and a system which recognizes an obstacle based on an image obtained by a CCD camera or the like. As a technology for determining whether a driver is performing inattentive driving, there is a known technology in which a face image of the driver is obtained, and a direction of a sight line and an orientation of the driver's face are checked, whereby whether the driver is performing inattentive driving is determined.

However, each of the above-mentioned obstacle detecting means and means for determining whether the driver is performing inattentive driving has both advantages and drawbacks. For example, when two or more types of obstacle detecting means having different detecting methods are provided, there is a possibility that only part of the obstacle detecting means detect an obstacle. However, in the above-mentioned related art, a study of an appropriate control method for support control is not sufficiently made, for the case where two or more types of the detecting means are provided and only part of the two or more types of the detecting means detect an obstacle.

SUMMARY OF THE INVENTION

The invention therefore provides a running support system for a vehicle, which supports running of a vehicle by using a radar and image recognition means as obstacle detecting means, and in which appropriate support control based on a result of detection performed by each control means is set.

According to an aspect of the invention, there is provided a running support system for a vehicle, which includes first object detecting means for detecting an object near a vehicle using a radar; second object detecting means for detecting an object near the vehicle by performing image recognition based on an obtained image of an area near the vehicle; and running support means for supporting running of the vehicle, characterized in that a control condition for running support control performed by the running support means is changed based on results of detection performed by the first object detecting means and the second object detecting means.

More particularly, by changing the control condition for the case where the running support control is performed based on the results of detection by the radar and image recognition means, that is, by changing control start time and a starting condition for each control (a threshold value and the like for the control), for example, the running support control is promoted or suppressed according to a combination of the results of detection, even when the other conditions are the same.

The starting condition for the running support control performed by the running support means may be shifted to the suppression side in the order of (i) the case where an object has been detected by only the first object detecting means, and (ii) the case where an object has been detected by only the second object detecting means, as compared to the case where an object has been detected by both the first object detecting means and the second object detecting means.

When the same obstacle has been detected by both the radar and the image recognition means which have different detecting principles, the detection is highly reliable. When an obstacle is detected by only one of the radar and the image recognition means, the starting condition for the support control is shifted to the suppression side as compared to the case where the same obstacle is detected by both the radar and the image recognition means. Particularly, when an obstacle is detected by only the image recognition means, the starting condition is shifted to the suppression side by a large amount, since the image recognition means is more likely to make an erroneous detection than the radar. For example, the start time of alarm generation and/or collision shock reducing control is retarded. Also, for example, the notification time of operation limit of follow-up running control and/or adaptive cruise control is retarded.

The running support system for a vehicle may further include inattentive condition detecting means for detecting whether a driver is performing inattentive driving, a control condition for running support control performed by the running support means may be changed also based on an inattentive condition of the driver detected by the inattentive condition detecting means.

More particularly, the control condition for the running support control is changed, that is, the start time of the control and the starting condition for starting each control (a threshold value for the control, and the like) are changed, based on the results of detection performed by detecting means (whether there is an obstacle, and whether the driver is performing inattentive driving). Thus, for example, the running support control is promoted or suppressed based on a combination of the detection results, even when the other conditions are the same.

For example, when the same obstacle has been detected by both the first object detecting means and the second object detecting means, and the inattentive condition detecting means has determined that the driver is performing inattentive driving, the starting condition for the running support control performed by the running support means is shifted to the promotion side, as compared to the case where the driver is not performing inattentive driving. The running support means performs at least one of follow-up running control, adaptive cruise control, obstacle alarm control, and collision shock reducing control.

When the same object has been detected by both the radar and the image recognition means which have different detecting principles, the detection is highly reliable. When the driver is performing inattentive driving, it is conceivable that the time when the driver recognizes an obstacle and starts an operation for avoiding danger is delayed, as compared to the case where the driver is not performing inattentive driving. Therefore, the starting condition for the running support control is shifted to the promotion side. For example, the start time of alarm generation and/or collision shock reducing control is advanced. Also, for example, the notification time of operation limit of follow-up running control and/or adaptive cruise control is advanced. As a result, it becomes easier for the driver to perform the operation for avoiding danger.

In contrast to this, when an obstacle, which has been detected by the first object detecting means, cannot be detected by the second object detecting means, and the inattentive condition detecting means has determined that the driver is performing inattentive driving, the starting condition for the running support control performed by the running support means is shifted to the promotion side, as compared to the case where the driver is not performing inattentive driving and the same obstacle has been detected by both the first object detecting means and the second object detecting means.

Shifting of the starting condition of the running support control to the promotion side is performed by making an amount of shift of the starting condition for the running support control, in which there is less necessity for high accuracy in the detection of an obstacle in the lateral direction, larger than an amount of shift of the starting condition for the running support control, in which there is greater necessity for high accuracy in the detection of an obstacle in the lateral direction.

When an obstacle, which has been detected by the radar, cannot be detected by the image recognition means, and the driver is performing inattentive driving, there is a possibility that an obstacle exists near the vehicle. However, information about the shape of the obstacle (particularly, the width of the obstacle in the lateral direction and the information about the lateral position of the obstacle), which can be obtained if the image recognition means is used, cannot be obtained. Accordingly, accuracy of the information necessary for the running support is reduced. Therefore, an amount of shift of the starting condition to the promotion side is made relatively small. The amount of shift of the starting condition for the control is made dependent on the greater necessity for high accuracy in the detection of an obstacle in the lateral direction, i.e. the less the necessity for high accuracy in the detection of an obstacle in the lateral direction, the larger the amount of shift of the starting condition for the control. Particularly, an amount of shift of the starting condition for the control, in which there is greater necessity for high accuracy in the detection of an obstacle in the lateral direction, is made smaller than an amount of shift of the starting condition for the control, in which there is less necessity for high accuracy in the detection of an obstacle in the lateral direction.

When an obstacle, which has been detected by the first object detecting means, cannot be detected by the second object detecting means, and the inattentive condition detecting means has determined that the driver is not performing inattentive driving, from among starting conditions for various types of running support control performed by the running support means, the starting condition for the running support control, in which there is greater necessity for high accuracy in the detection of an obstacle in the lateral direction, may be shifted to the suppression side.

When an obstacle, which has been detected by the radar, cannot be detected by the image recognition means, and the driver keeps his/her eyes on the road ahead, it is expected that the driver will recognize the obstacle. Therefore, the starting condition for the running support control is shifted to the suppression side in consideration of the fact that the accuracy of the information necessary for the running support is reduced. For example, the start time of alarm generation and/or collision shock reducing control is retarded. Also, for example, the notification time of operation limit of follow-up running control and/or adaptive cruise control is retarded. As a result, intervention of the support system in the driver is suppressed.

The running support control, in which there is less necessity for high accuracy in the detection of an obstacle in the lateral direction, is, for example, the follow-up running control or the adaptive cruise control. The running support control, in which there is greater necessity for high accuracy in the detection of an obstacle in the lateral direction, is, for example, the obstacle alarm control or the collision shock reducing control. In the follow-up running control for following a preceding vehicle or the adaptive cruise control for maintaining a distance between the host vehicle and the preceding vehicle, usually, the information about the lateral width of the preceding vehicle, which is the subject of the control, is not important. In contrast to this, in the obstacle alarm control or the collision shock reducing control, an obstacle, which is the subject of the control, is not limited to the preceding vehicle, and the information about the lateral position and the lateral width of the obstacle is important.

The running support means is a follow-up running control device or an adaptive cruise control device. When an obstacle, which has been detected by the second object detecting means, has not been detected by the first object detecting means, the running support means prohibits or interrupts the follow-up running control or the adaptive cruise control.

In the follow-up running control or the adaptive cruise control, the control for detecting a preceding vehicle and following the preceding vehicle is performed, or the control for detecting a preceding vehicle and maintaining a distance between the host vehicle and the preceding vehicle is performed. It is easy to detect a preceding vehicle, which is the subject of the control, using the radar. When an object (obstacle) cannot be detected by the radar, and can be detected by only the image recognition means, there is a high possibility that the object is a body which does not reflect an electric wave or the like sufficiently, and the object is not a preceding vehicle. In this case, a process for suppressing the follow-up running control or the adaptive cruise control is performed.

The running support means is a collision shock reducing control device. When an obstacle, which has been detected by the second object detecting means, has not been detected by the first object detecting means, (1) the start time for the collision shock reducing control is retarded as compared to the normal state. Further, when the inattentive condition detecting means has determined that the driver is performing inattentive driving, the start time for the collision shock reducing control is retarded by a smaller amount than that in the case where it has been determined that the driver is not performing inattentive driving. Alternatively, (2) the contents of the collision shock reducing control are changed to those of control for the case where a shock due to collision is small as compared to the normal state. The collision shock reducing control is performed by one of means for minimizing an amount of deformation of the vehicle, means for securing restraint of a passenger, and means for changing a damping force of suspension means.

When there is an object which cannot be easily detected by the radar, there is a high possibility that the object is not a solid object such as metal. Therefore, when there is a possibility that the host vehicle will collide with an obstacle which has not been detected by the radar, the start time for the collision shock control is retarded, or the contents of the collision shock reducing control are changed to those of the control for the case where a shock due to collision is small.

According to another aspect of the invention, there is provided a running support system for a vehicle, which can perform follow-up running control or adaptive cruise control, and obstacle alarm control, characterized in that notification of operation limit of the follow-up running control and/or the adaptive cruise control is made before an obstacle alarm is generated by the obstacle alarm control.

The follow-up running control or the adaptive cruise control is performed on the assumption that an obstacle can be avoided by the normal operation for avoiding danger. In contrast to this, the obstacle alarm control is performed when an urgent operation for avoiding danger is required. Therefore, notification of the operation limit of the follow-up running control and/or the adaptive cruise control is made before an obstacle alarm is generated.

According to the invention, by changing the control condition for the support control performed by each running support means based on results of obstacle detection performed by the radar and the image recognition means, appropriate running support can be performed based on the results of detection.

In addition, when a result of detection of an inattentive condition of the driver is taken into consideration, by changing the control condition for the running support control performed by each running support means, an appropriate running support can be performed based not only on the result of detection of an object but also on the inattentive condition of the driver.

By optimizing the order of performing the notification of the operation limit of the follow-up running control and/or the adaptive cruise control and generation of an obstacle alarm, an obstacle alarm is generated during the follow-up running control or the adaptive cruise control, and it is possible to suppress the following situation in which the follow-up running control or the adaptive cruise control is continued until the state comes close to the state where the urgent operation for avoiding danger needs to be performed. As a result, it becomes easier for the driver to perform the operation for avoiding danger.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which:

FIG. 5 is a flowchart for describing an obstacle determination and a control routine based on a result of the determination in the vehicle control system in FIG. 4.

DETAILED DESCRIPTION OF THE EXEMPLARY EMBODIMENTS

Figure 1:
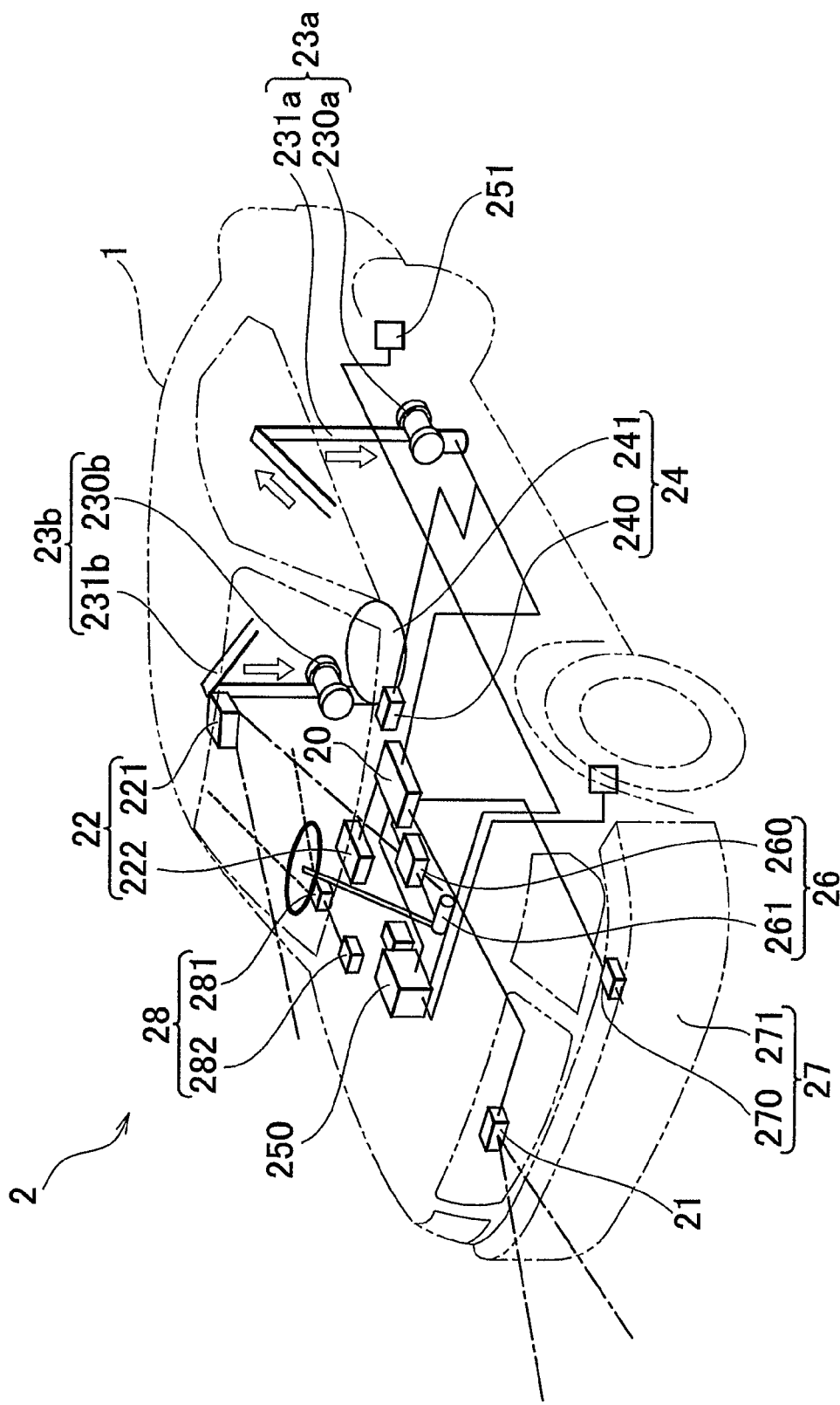
FIG. 1 is a view schematically showing a structure of a vehicle in which a running support system for a vehicle according to the invention is mounted.

Hereafter, preferred embodiments of the invention will be described in detail with reference to accompanying drawings. In order to facilitate understanding of the description, the same reference numerals will be assigned to the same elements in the drawings, if possible. Also, overlapping descriptions will not be made.

Figure 2:
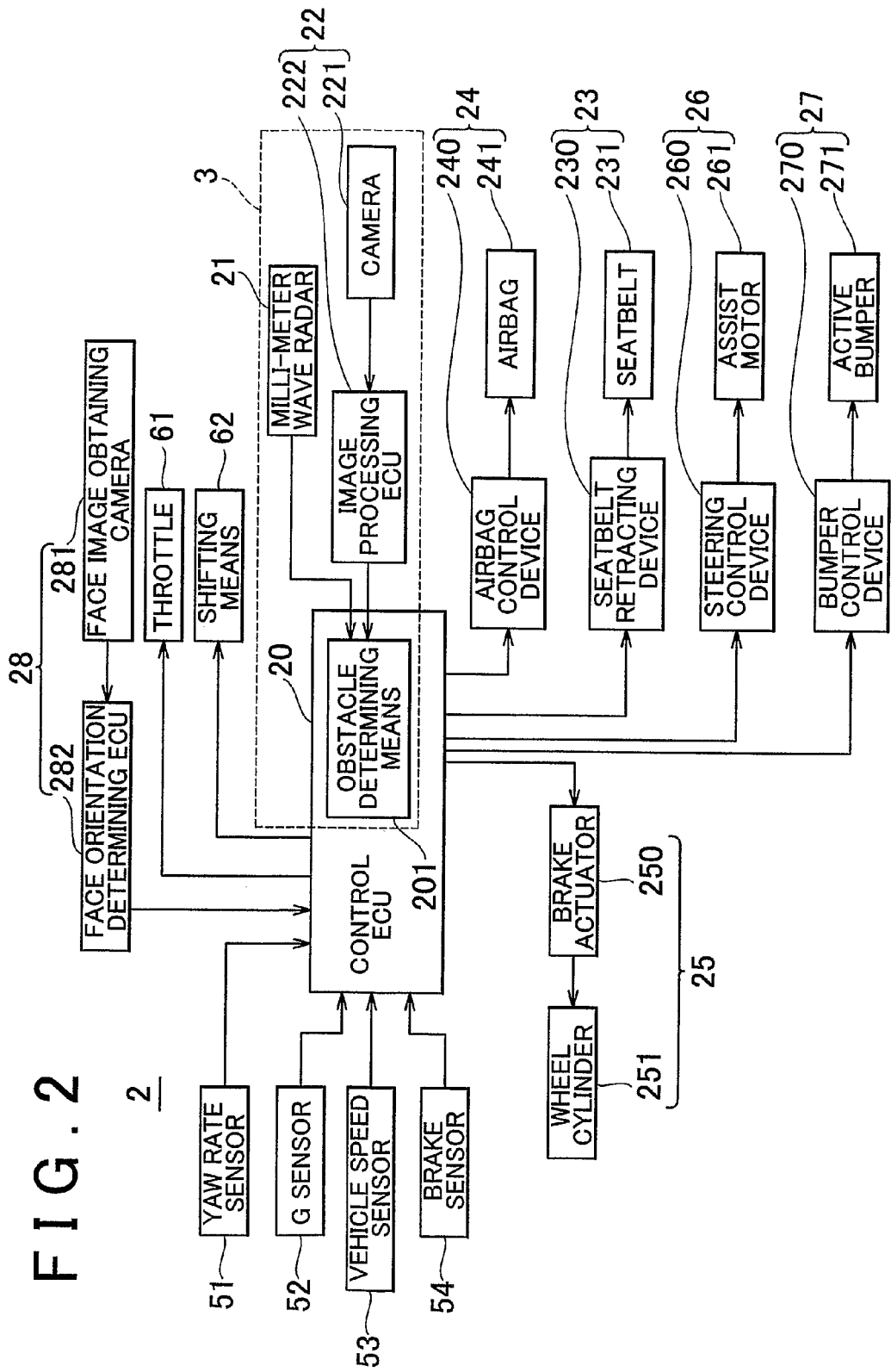
FIG. 2 is a block diagram showing a vehicle control system corresponding to a running support system for a vehicle according to a first embodiment of the invention.

FIG. 1 is a view schematically showing a structure of a vehicle in which a running support system for a vehicle according to a first embodiment of the invention is mounted. FIG. 2 is a block diagram showing a vehicle control system 2 corresponding to the running support system for a vehicle. The vehicle control system 2 mounted in a vehicle 1 includes an ECU 20 which controls the entire system; a millimeter wave radar 21 which corresponds to first object detecting means for scanning an area ahead of the vehicle and detecting an obstacle; image recognition means 22 corresponding to second object detecting means for obtaining an image of the area ahead of the vehicle and detecting an obstacle by performing image recognition; a seatbelt device 23, an airbag device 24, a brake device 25, an automatic steering device 26, a pedestrian protection device 27, each of the devices 23 to 27 corresponding to danger reducing means for reducing danger due to a collision; and a face orientation detecting device 28 which detects an inattentive condition of a driver (corresponding to inattentive condition detecting means in the invention).

FIG. 1 shows a vehicle with a right-hand steering wheel. As the seatbelt device 23, only a seatbelt device 23b for a driver's seat and a seatbelt device 23a for an assistant driver's seat are shown in FIG. 1. As the airbag device 24, only an airbag device for an assistant driver's seat is shown in FIG. 1.

The image recognition means 22 includes a front camera 221 which corresponds to image capturing means for capturing an image of an area ahead of the vehicle; and an image processing ECU 222 which detects an obstacle based on the obtained image by performing image recognition. The front camera 221 is preferably a stereo camera. The image processing ECU 222 includes a CPU, ROM, RAM and the like.

The seatbelt device 23a includes a seatbelt body 231a and a seat belt retracting device 230a. The seatbelt device 23b includes a seatbelt body 231b and a seat belt retracting device 230b. Hereafter, reference characters "a" and "b" of these devices will not be shown unless otherwise required. The airbag device 24 includes an airbag body 241 and an airbag control device 240 provided with a seating sensor (not shown) and the like. The brake device 25 includes a hydraulic wheel cylinder 251 which operates a disk brake or a drum brake and each brake (not shown) which are attached to each wheel; and a brake actuator 250 which controls a hydraulic pressure to be supplied to each wheel cylinder 251. The automatic steering device 26 includes a steering control device 260 which controls an operation of a steering system; and an electric assist motor 261 which is connected to the steering system and which supplies a steering force to the steering system.

The face orientation detecting device 28 is provided in an instrument panel or on a steering column cover in a vehicle compartment. The face orientation detecting device 28 includes a face image obtaining camera 281 which obtains a face image of the driver; and a face orientation determining ECU 282 which determines an orientation of the face of the driver, that is, a direction of a sight line of the driver, based on the obtained face image by performing image recognition. The face orientation determining ECU 282 includes a CPU, ROM, RAM, and the like, as in the case of the image processing ECU 222. As the face image obtaining camera 281, a camera, which irradiates the driver with near-infrared strobe light and which obtains the reflected light image, is preferably used such that the face orientation can be stably determined without being affected by environmental conditions such as brightness in the vehicle compartment.

The outputs from the millimeter wave radar 21, the image processing ECU 222, and the face orientation determining ECU 282 are input in an obstacle determining portion 201 in the control ECU 20 serving as control means. The control ECU 20 controls operations of the airbag control device 240, the seatbelt retracting device 230, and the brake actuator 250. In addition, various state amounts of the vehicle are input in the control ECU 20 from a yaw rate sensor 51, a G sensor 52, a vehicle speed sensor 53, a brake switch 54 and the like. The control ECU 20 also controls operations of a throttle 61, shifting means 62, and the like. The control ECU 20 includes a CPU, ROM, RAM and the like, as in the cases of the image processing ECU 222 and the face orientation determining ECU 282. Concerning hardware, the image processing ECU 222, the face orientation determining ECU 282, and the control ECU 20 may be integrally formed, or may share one portion. Concerning software, each of the image processing ECU 222, the face orientation determining ECU 282, and the control ECU 20 may perform processing independently. The obstacle determining portion 201 in the control ECU 20 may be formed as independent hardware. Alternatively, the obstacle determining portion 201 may be formed integrally with another ECU.

The vehicle control system 2, which corresponds to the running support system for a vehicle according to the invention, combines a result of obstacle detection performed by the millimeter wave radar 21 and a result of obstacle detection performed by the imager recognition means 22 using the obstacle determining portion 201, and then identifies an obstacle. The control ECU 20 performs follow-up running control, an operation for avoiding collision with an obstacle, collision shock reducing control, and the like, based on the information about the identified obstacle and a result of face orientation determination performed by the face orientation detecting device 28.

Figure 3A:
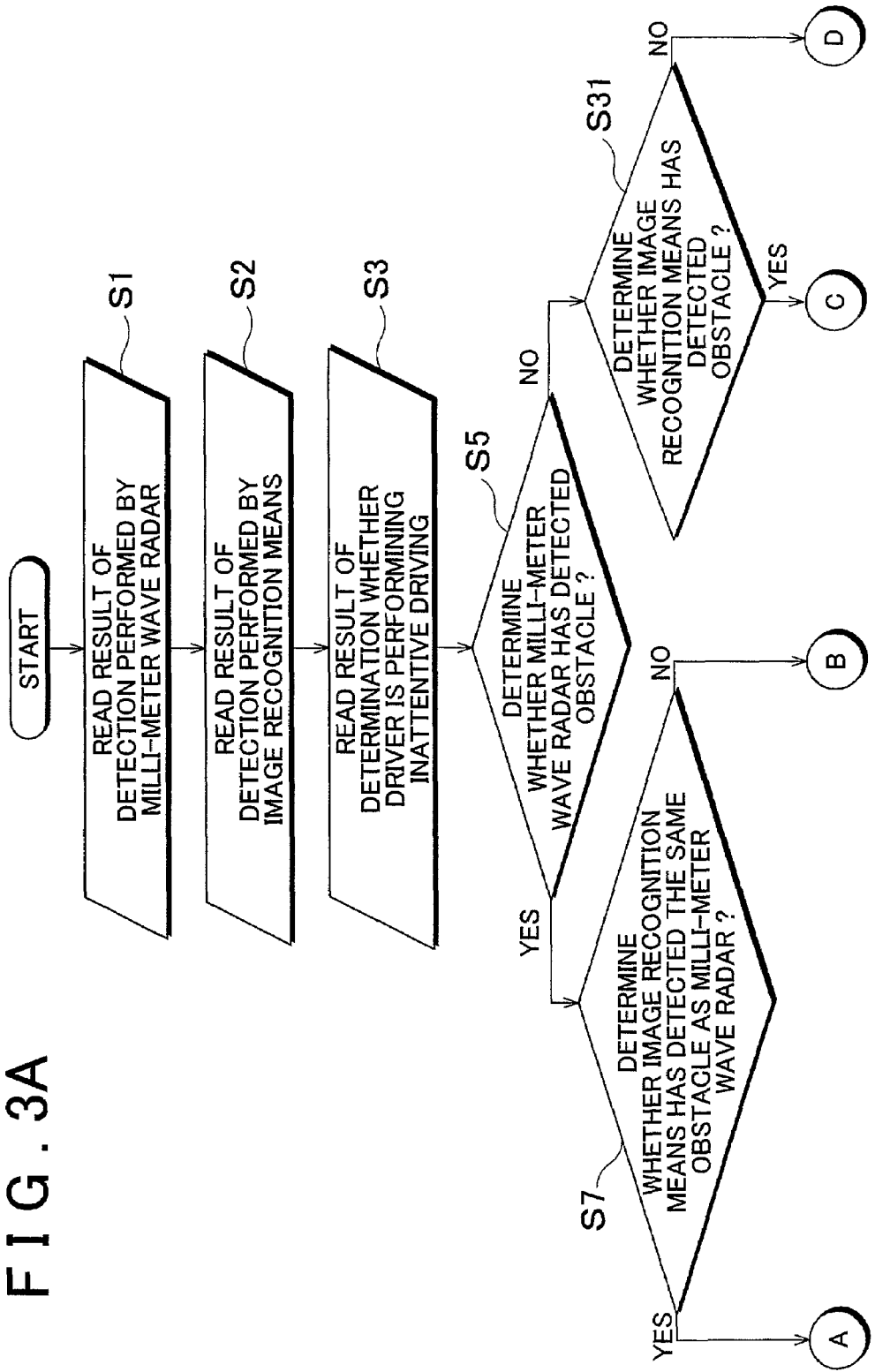
FIGS. 3A and 3B are a flowchart for describing an obstacle determination and a control routine based on a result of the determination in the vehicle control system in FIG. 2.
Figure 3B:
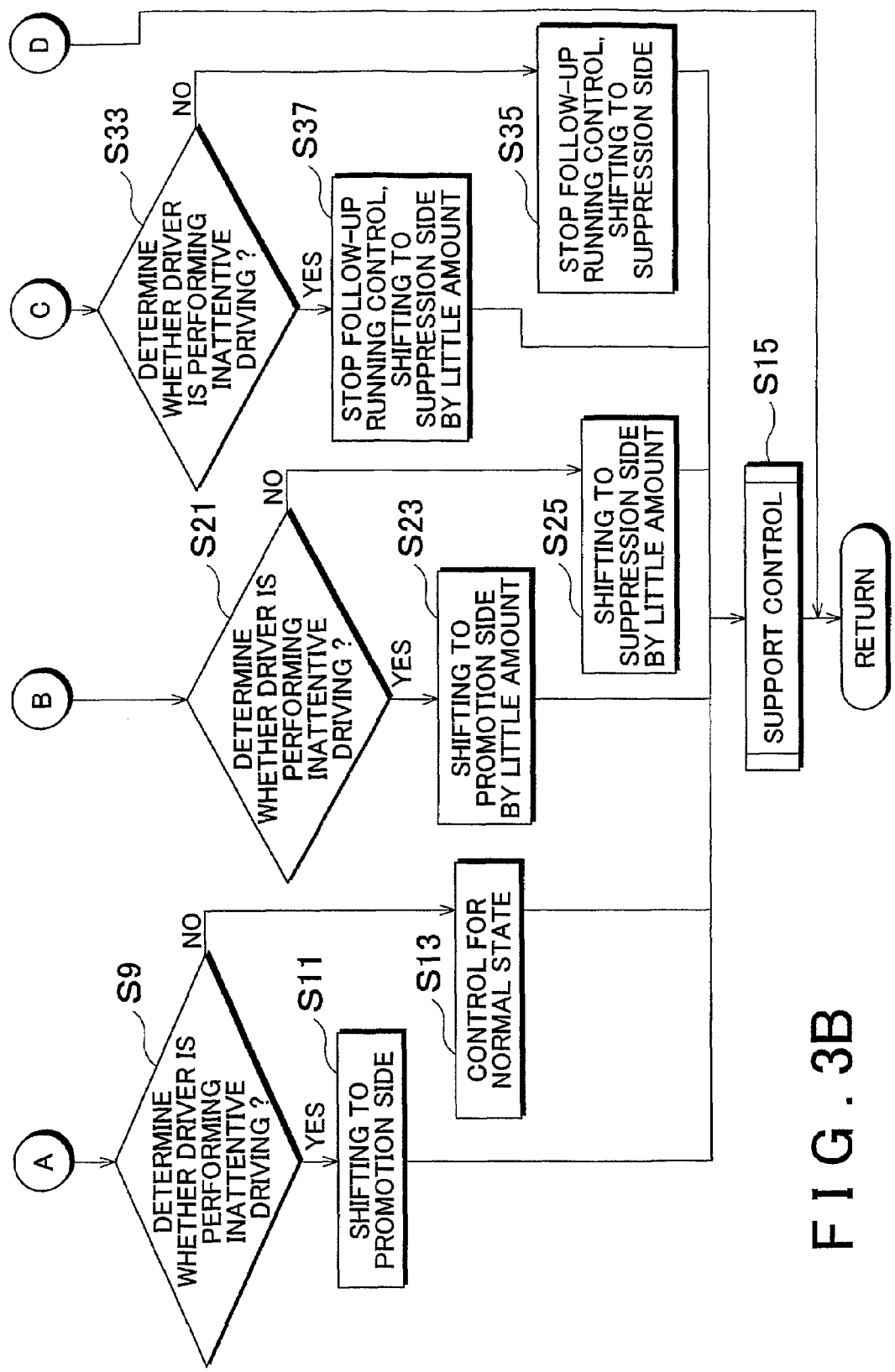

FIGS. 3A and 3B are a flowchart for describing an obstacle determination and a control routine based on a result of the determination in the vehicle control system 2. The control routine is repeatedly performed at predetermined intervals during a period from when a power supply of the vehicle is turned ON until when the power supply is turned OFF.

First, a result of detection of a potential obstacle performed by the millimeter wave radar 21 is read in step S1, a result of detection of a potential obstacle performed by the image recognition means 22 is read in step S2, and a result of determination performed by the face orientation detecting device 28 is read in step S3.

The millimeter wave radar 21 irradiate an electric wave forward of the vehicle 1 while scanning the electric wave in the horizontal direction, and receives the electric wave reflected from a surface of an obstacle such as a preceding vehicle. After receiving the electric wave, the millimeter wave radar 21 determines whether there is a potential obstacle, and obtains a positional relationship and a distance with the potential obstacle, a relative speed, and the like, and outputs them as results of detection.

In the image recognition means 22, the image processing ECU 222 extracts an potential obstacle from the images captured by the camera 221 by edge extraction, a pattern recognition process, or the like. When a stereo camera is employed as the camera 221, a distance and a positional relationship (or a spatial position) with the potential obstacle are obtained according to a triangulation method based on the difference in the position of the object between the right and left obtained images, and a relative speed is obtained based on an amount of change with respect to the distance obtained in the previous frame time. When a stereo camera is not employed, a distance and a spatial position with the obstacle are preferably estimated based on the position of the object in the image.

In the face orientation detecting device 28, the face orientation determining ECU 282 detects an angle of a face orientation of the driver based on a face image of the driver, which is obtained by the face image obtaining camera 281. It is determined whether the driver keeps his/her eyes on the road ahead or performing inattentive driving, based on the detected angle. For example, it is preferable to detect the positions of both eyes of the driver based on the face image, and detect the face orientation based on the positions of the both eyes of the driver in the face image.

Next, it is determined in step S5 whether the millimeter wave radar 21 has detected an obstacle. When an affirmative determination is made in step 5, step S7 is then performed in which it is determined whether the image recognition means 22 also has detected the same obstacle as the millimeter wave radar 21 has detected. When both the millimeter wave radar 21 and the image recognition means 22 have detected the same obstacle, step S9 is then performed in which it is determined whether the driver is performing inattentive driving. When an affirmative determination is made in step S9, step S11 is then performed in which the starting condition for the running support control is shifted to the promotion side. More particularly, the notification time of the operation limit of the adaptive cruise control and/or the congestion follow-up running control, the generation time of an obstacle alarm, the time of previous supply of a hydraulic pressure for an intervention brake, and the like are advanced as compared to the normal state (the state where the driver is not performing inattentive driving). Step S15 is then performed in which the support control is performed at the set time, after which the routine ends.

On the other hand, when it is determined in step S9 that the driver is not performing inattentive driving, that is, the driver keeps his/her eyes on the road ahead, step S13 is then performed. In step S13, the starting condition for the running support control is returned to the condition for the normal state. Next, the support control is performed in step S15.

When both the millimeter wave radar 21 and the image recognition means 22 have detected the same obstacle, there is a high possibility that the obstacle is detected correctly. In this case, if the driver is performing inattentive driving, there is a high possibility that the time when the driver realizes the obstacle by himself/herself is delayed, as compared to the case where the driver keeps his/her eyes on the road ahead. In such a case, the generation time of an obstacle alarm and the notification time of the operation limit are advanced such that the driver realizes the obstacle as soon as possible. Also, the time of the control is advanced such that an operation for avoiding danger can be sufficiently performed and a shock due to a collision can be reduced sufficiently even if an operation for avoiding danger performed by the driver is delayed.

When the driver keeps his/her eyes on the road ahead, it is expected that the driver will realize the obstacle by himself/herself and performs the operation for avoiding danger in advance. Therefore, by generating an obstacle alarm or notifying the operation limit, when the driver has not performed the operation for avoiding danger even at the time at which the driver should have realized the obstacle and started the operation for avoiding danger in the normal state, the collision shock reducing control is performed in the case where there is a high possibility that a collision occurs even if the operation for avoiding danger is started. These operation times are referred to as the "standard operation time".

Namely, when the driver is performing inattentive driving, the operation time is advanced, and the starting condition for the support control is shifted to the side on which the support control is promoted, that is, the promotion side.

When it is determined in step S7 that the obstacle, which has been detected by the millimeter wave radar 21, has not been detected by the image recognition means 22, step S21 is then performed in which it is determined whether the driver is performing inattentive driving. When an affirmative determination is made in step S21, step S23 is then performed. In step S23, from among the starting conditions for the running support control, the starting condition for the control, in which the information about the lateral position is not required, is shifted to the promotion side, and the starting condition for the control, in which the information about the lateral position is required, is shifted to the promotion side by a small amount compared to the control in which information about the lateral position is not required. More particularly, the notification time of the operation limit of the adaptive cruise control and/or the congestion follow-up running control is advanced as compared to the normal state. The generation time of an obstacle alarm, the time of previous supply of a hydraulic pressure for the intervention brake, and the like are advanced by a little amount, as compared to the normal state. Then, the support control is performed at the set time in step S15.

The millimeter wave radar 21 cannot accurately detect the information about the lateral position and the lateral width of the obstacle, unlike the image recognition means 22. Therefore, the generation time of an obstacle alarm and the start time of the collision shock reducing control, in which the above information is required, are retarded by a little amount, as compared to the case where the image recognition means 22 also has detected the obstacle. Meanwhile, in the adaptive cruise control and the congestion follow-up running control, the preceding vehicle is a subject of the control and the accurate information about the lateral position and the lateral width of the obstacle is not required. Therefore, the control is performed at the same control time as the case where the image recognition means 22 also has detected the obstacle.

On the other hand, when it is determined in step S21 that the driver is not performing inattentive driving, that is, the driver keeps his/her eyes on the road ahead, step S25 is then performed. In step S25, from among the starting conditions for the running support control, the starting condition for the control, in which the information about the lateral position is require, is shifted to the suppression side by a little amount, and the starting condition for the control, in which the information about the lateral position is not required, is maintained at the starting condition in the normal state. More particularly, the notification time of the operation limit of the adaptive cruise control and/or the congestion follow-up running control is advanced as compared to the normal state. The generation time of an obstacle alarm, the time of previous supply of a hydraulic pressure for the intervention brake, and the like are retarded by a little amount as compared to the normal state. Step S15 is then performed in which the support control is performed at the set time.

In the case of the control in which the information about the lateral information is not required, when the millimeter wave radar 21 has detected an obstacle, the control is performed regardless of the result of detection performed by the image recognition means 22. In contrast to this, in the case of the control in which the information about the lateral information is required, if the control is performed in the state where the control information is insufficient, the accuracy of the control is reduced. When the driver keeps his/her eyes on the road ahead, it is expected that the driver will perform the operation for avoiding danger by himself/herself. Therefore, in order to give priority to suppression of reduction in the accuracy of the control, the starting condition for the control is shifted to the suppression side by a little amount.

When it is determined in step S5 that the millimeter wave radar 21 has not detected an obstacle, step S31 is then performed in which it is determined whether the image recognition means 22 has detected an obstacle. When it is determined that the image recognition means 22 has detected an obstacle, step S33 is then performed in which it is determined whether the driver is performing inattentive driving. When it is determined in step S33 that the driver is not performing inattentive driving, that is, the driver keeps his/her eyes on the road ahead, step S35 is then performed in which the time of the running support control is changed. More particularly, in the case of the adaptive cruise control or the congestion follow-up running control, it is considered that there is no subject of the control, and the control is prohibited or stopped. The fact that the millimeter wave radar 21 cannot detect an obstacle signifies that there is no object having high reflexivity such as metal ahead of the vehicle. Therefore, the control is prohibited or stopped, since there is a considerably high possibility that there is no preceding vehicle (i.e., a vehicle including an object having high reflexivity such as a bumper and a car registration plate).

When only the image recognition means 22 has detected an obstacle, there is a high possibility that the obstacle is not a solid object such as metal, which easily respond to the radar. In this case, even if a collision occurs, the damage due to the collision is likely to be small. Therefore, the generation time of an obstacle alarm, the time of previous supply of a hydraulic pressure for the intervention brake, and the like are retarded as compared to the normal state (the state where the driver is not performing inattentive driving). Also, an amount of protrusion of an active bumper 271 is reduced, an amount of previous retraction and a tensile force of the seatbelt 231 are reduced. Also, a threshold value for starting the operation of each danger reducing means is increased as compared to the case where the millimeter wave radar 21 has detected an obstacle such that each danger reducing means cannot start operating easily. In addition, a suspension may be shifted to the soft mode side by a little amount. Then, step S15 is performed in which the support control is performed at the set time, after which the routine ends.

When it is determined in step S33 that the driver is performing inattentive driving, step S37 is then performed in which the time for running support control is changed. In this case, the control is performed basically at the same time as the case where the driver is not performing inattentive driving. However, when the driver is performing inattentive driving, there is a high possibility that reaction of the driver to the obstacle is delayed, as compared to the case where the driver is not performing inattentive driving. The generation time of an obstacle alarm, the time of previous supply of a hydraulic pressure for the intervention brake, and the like are retarded by an amount smaller than that in the case where the driver is not performing inattentive driving. The starting conditions of the other control may be shifted to the suppression side by an amount smaller than that in that case where the driver is not performing inattentive driving.

When it is determined in step S31 that the image recognition means also has not detected an obstacle, the routine ends without performing the support control. When two or more obstacles have been detected, priority is given to the result of detection performed by the millimeter wave radar.

Examples of the support control performed in step S15 will be described. For example, when a follow-up running control mode is ON, a preceding vehicle is determined based on the result of recognition, and the throttle 61, the shifting means 62, and the brake actuator 250 are controlled based on the separately detected information about a traffic lane. Thus, the host vehicle follows the preceding vehicle at a predetermined speed while maintaining the distance between the host vehicle and the preceding vehicle at a constant value. An example of a method for obtaining the information about the traffic lane is the method in which the running lane is recognized by recognizing a white line using the image recognition means 22. Other than this method, there may employed a method in which the information about the road is accumulated and read; a method in which the information about the road, on which the vehicle is running, is obtained by communication means; a method in which a marker or the like immersed in the road is detected and the information about the running lane is obtained; or the like.

When it is determined that there is a possibility that the host vehicle will contact or collide with the obstacle based on the position/speed information about the obstacle and the route on which the host vehicle will be proceeding, that is estimated based on the outputs from the yaw rate sensor 51, the G sensor 52, and the vehicle speed sensor 53, an alarm is generated using an image or voice output from a display unit or a speaker (not shown) such that the driver is notified to perform an operation for avoiding contact and a collision with the obstacle.

Further, when it is determined that a collision with the obstacle cannot be avoided even if the operation for avoiding danger is performed, each collision shock reducing means is controlled so as to perform a predetermined collision shock reducing operation. Thus, a shock due to a collision given to a passenger of the host vehicle, a pedestrian, and a passenger in the vehicle which collides with the host vehicle is reduced. It is determined whether a collision with the obstacle can be avoided by determining whether the estimated time period until the collision, which is obtained by dividing the distance with the obstacle by the relative speed with the obstacle, is equal to or lower than a threshold value which is necessary for performing the operation for avoiding a collision.

An example of the collision shock reducing control is the control of the brake device 25. An example of this control is the automatic braking control (intervention brake) in which the brake actuator 250 is operated, and a barking hydraulic pressure is supplied to each wheel cylinder 251, whereby braking is automatically performed and the vehicle is decelerated. Alternatively, the pre-crash brake assist (PBA) control may be performed. In the pre-crash brake assist control, when the brake switch is turned ON, an assist hydraulic pressure is set to a high value as compared to the normal state, whereby response characteristics for the depression of the brake pedal performed by the driver are improved and more prompt deceleration can be performed. Thus, by decreasing the speed of the host vehicle at the time of collision, a shock due to collision is reduced.

In the seatbelt device 23, by retracting the seatbelt 231 using the seatbelt retracting device 230 in advance, the passenger is restrained at the seat before a collision occurs, and movement of the passenger at the time of collision is suppressed, whereby the damage due to the collision is reduced. Also, it is possible to give an alarm to the passenger about an imminent danger by restriction of the passenger. Therefore, even in the case where a collision occurs, the passenger can prepare for the collision, which is effective in reduction of damage.

In the airbag device 24, the airbag control device 240 performs control based on the posture and body build of the passenger, the direction in which the vehicle collides with the obstacle and the collision timing such that the airbag 241 operates at the optimum time and in the optimum state. By performing the airbag control along with the seatbelt control, it is possible to reliably restrain the passenger at the seat, and reduce a shock given to the passenger caused by operating the airbag, thereby effectively reducing the damage due to the collision.

In the automatic steering device 26, when it is determined that it is possible to avoid a collision with the obstacle or reduce a shock due to the collision by appropriate steering, the steering control device 260 controls the assist motor 261 such that steering is performed by supplying a required steering force so as to avoid the collision with the obstacle or reduce the shock due to the collision. As a result, the collision with the obstacle is avoided or the shock due to the collision is reduced.

When it is estimated that the object with which the host vehicle will collide is a pedestrian, in order to reduce a shock due to the collision, which is given to the pedestrian, the bumper control device 270 changes the amount of protrusion of the active bumper 271 such that the shock due to the collision, which is given to the pedestrian, is absorbed. Thus, even when the collision occurs, the shock given to the pedestrian is absorbed, and particularly, the damage to the leg portion of the pedestrian is reduced.

The notification of the operation limit of the adaptive cruise control and/or the follow-up running control is made so as to generate an alarm to request a deceleration operation performed by the driver, when a degree of deceleration required based on the positional relationship with the preceding vehicle exceeds a predetermined maximum degree of deceleration (which is set to a relatively low degree of deceleration). The notification of the operation limit of the adaptive cruise control and/or the follow-up running control is set on the assumption that the obstacle can be avoided by the normal operation for avoiding danger performed by the driver. In contrast to this, the obstacle alarm is generated when the obstacle needs to be avoided urgently. Therefore, the obstacle alarm is generated when the host vehicle comes closer to the obstacle, that is, when relatively rapid deceleration is required. Therefore, the notification time of the operation limit of the adaptive cruise control and/or the follow-up running control needs to be set before the notification time of the obstacle alarm.

The PBA control (previous supply of a hydraulic pressure for the intervention brake) is performed on the precondition that the driver has operated the brake. Therefore, the driver needs to realize the obstacle and operate the brake. The obstacle alarm needs be generated before the previous supply of a hydraulic pressure for the intervention brake in the PBA control such that the driver reliably realizes the obstacle.

The control using the intervention brake is performed when the driver performs neither the operation for avoiding danger nor the braking control although there is a high possibility that a collision will occur. In this control, braking is performed regardless of the intention of the driver. Therefore, this control needs to be performed after the previous supply of a hydraulic pressure for the intervention brake, that is, after the wait for the PBA control is completed.

The passenger needs to be constrained by the seatbelt before the intervention brake is operated, in consideration of the fact that the upper body of the driver may unintentionally move backward and forward due to the operation of the intervention brake. Also, in order to prevent the front portion of the vehicle from plunging forward due to the operation of the intervention brake, the mode of the suspension needs to be changed to the hard mode before operation of the intervention brake.

As a result, the order of operation of each support control at the time of actual collision is set as follows; (1) notification of the operation limit of the adaptive cruise control and/or follow-up running control, (2) generation of an obstacle alarm, (3) the previous supply of a hydraulic pressure for the intervention brake in the PBA control, change of the mode of the suspension to the hard mode, (4) restraint of the passenger by the seatbelt, (5) operation of the intervention brake, operation of the active damper, (6) collision, and (7) retraction of the seatbelt, operation of the airbag, and the like.

According to the embodiment, it is possible to optimally control the control state (particularly, the start time and the contents of the operation) of each running support control based on the characteristics of each of the millimeter wave radar and the image recognition means and the recognition state of the driver. As a result, when it can be considered that the driver keeps his/her eyes on the road ahead, the starting condition of the control is shifted to the suppression side as compared to the case where the driver is performing inattentive driving. Thus, the system does not operate more frequently than necessary, and the driver does not feel bothered. As a result, drivability increases. In addition, the operation systems can be operated in the optimum order based on the characteristics thereof, appropriate control can be performed. Therefore, the performance for avoiding a collision is improved. Even when a collision occurs, a shock due to the collision, which is given to the passenger and the pedestrian, can be reduced.

Figure 4:
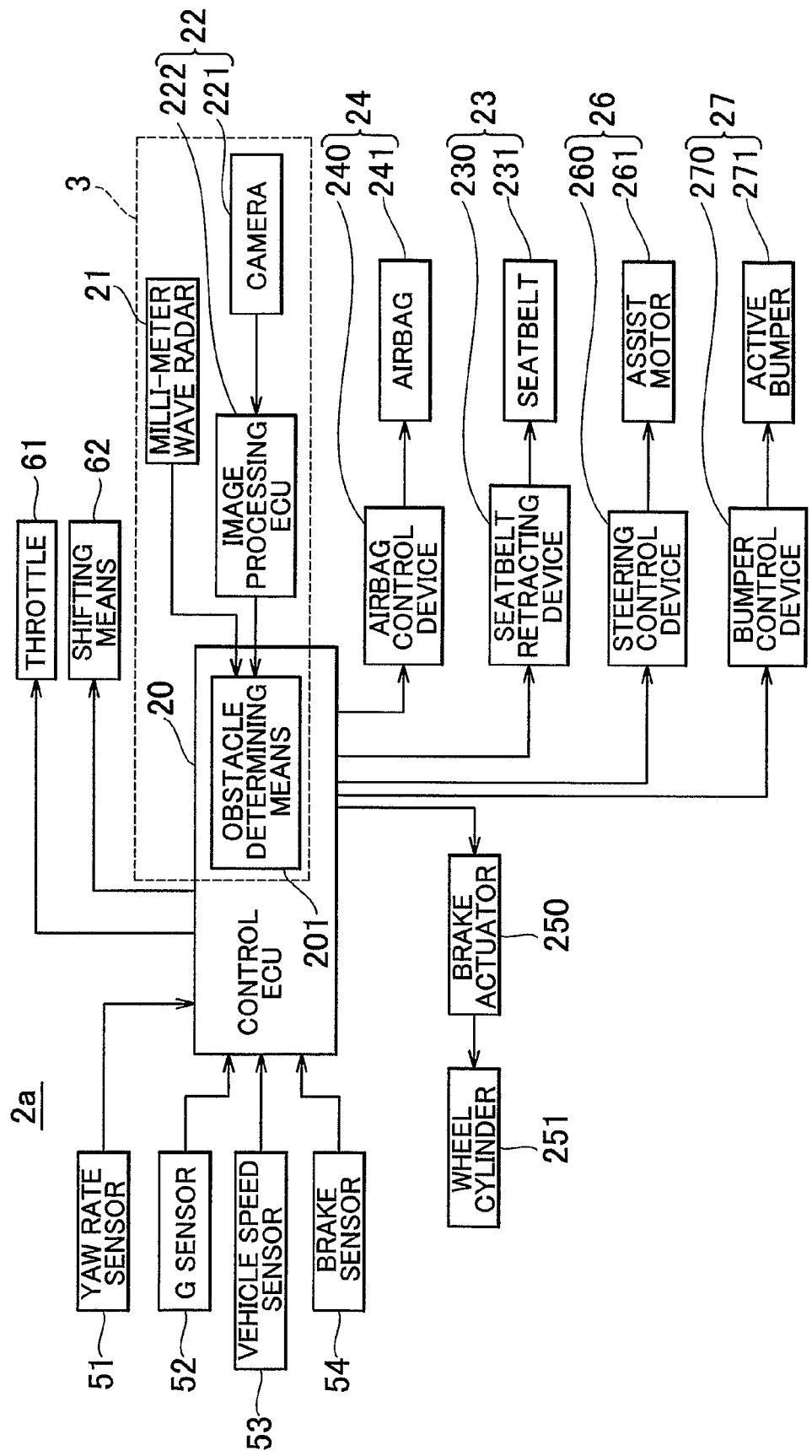
FIG. 4 is a block diagram showing a vehicle control system corresponding to a running support system for a vehicle according a second embodiment of the invention.

Next, a running support system for a vehicle according to a second embodiment of the invention will be described with reference to FIGS. 4 and 5. FIG. 4 is a block diagram showing a vehicle control system $2a$ according to the embodiment. The basic structure of the vehicle control system $2a$ is the same as that of the vehicle control system 2 shown in FIG. 2, except for the fact that the vehicle control system $2a$ does not include the face orientation detecting device 28.

An obstacle determination according to the embodiment and a control operation based on the determination will be described with reference to the flowchart in FIG. 5. The control routine is repeatedly performed at predetermined intervals by the ECU 20 during the time period from when the power supply of the vehicle is turned ON until when the power supply is turned OFF.

First, a result of detection of a potential obstacle performed by the millimeter wave radar 21 is read in step S51, and a result of detection of a potential obstacle performed by the image recognition means 22 is read in step S52. Steps S 51 and S52 are the same as steps S1 and S2 in the first embodiment.

Next, it is determined in step S53 whether the millimeter wave radar 21 has detected an obstacle. When an affirmative determination is made, step S54 is then performed. In step S54, it is determined whether the image recognition means 22 also has detected the same obstacle as the millimeter wave radar 21. When both the millimeter wave radar 21 and the image recognition mean 22 have detected the same obstacle, step S55 is then performed in which the running support control is set to the normal control. Then, step S57 is performed in which the support control is performed at the set time, after which the routine ends.

When it is determined in step S54 that the obstacle which has detected by the millimeter wave radar 21 has not been detected by the image recognition means 22, step S56 is then performed in which the starting condition for the running support control is shifted to the suppression side by a little amount. Then, the support control is performed at the set time in step 57.

When it is determined in step S53 that the millimeter wave radar 21 has not detected an obstacle, step S58 is then performed in which it is determined whether the image recognition means 22 has detected an obstacle. When it is determined that the image recognition means 22 has detected an obstacle, step S59 is then performed in which the time of the running support control is shifted to the suppression side. Then, step S57 is performed in which the support control is performed at the set time, after which the routine ends.

When it is determined in step S58 that the image recognition means 22 also has not detected an obstacle, the routine ends without performing the support control. When two or more obstacles have been detected, priority is given to a result of detection performed by the millimeter wave radar 21.

As mentioned above, when both the millimeter wave radar 21 and the image recognition means 22 have detected the same obstacle, there is a high possibility that the obstacle has been detected correctly. Therefore, the support control is performed at the normal time. When only one of the millimeter wave radar 21 and the image recognition means 22 has detected an obstacle, the reliability of the detection is low, as compared to the case where both the millimeter wave radar 21 and the image recognition means 22 have detected the same obstacle. Therefore, the start time of the support control is retarded.

When the millimeter wave radar 21 and the image recognition means 22 are compared to each other, the millimeter wave radar 21 can detect an obstacle from a position relatively far from the obstacle, and the reliability thereof is higher than that of the image recognition means 22. On the other hand, the image recognition means 22 has an advantage that detailed information such as the information about the lateral position of the object can be obtained. Therefore, when only the image recognition means 22 has detected an obstacle, the control time is further suppressed, as compared to the case where only the millimeter wave radar 21, which has higher reliability, has detected an obstacle.

More particularly, the notification time of the operation limit of the adaptive cruise control and/or the congestion follow-up running control; the generation time of an obstacle alarm, an amount of a hydraulic pressure supplied for the intervention brake in advance; and the like are suppressed as compared to the normal state.

So far, the vehicle control system including both a follow-up running device and the collision shock reducing control device have been described, as the vehicle control system. However, the vehicle control system including one device which uses a result of recognition, for example, a collision alarm device may be employed. Also, the collision shock reducing device need not include all of the above-mentioned devices, and is not limited to the above-mentioned device.

The invention claimed is:

1. A running support system for a vehicle, comprising:
   a first object detecting portion that detects an object near the vehicle using a radar;

a second object detecting portion that detects the object near the vehicle by performing image recognition based on an obtained image of an area near the vehicle; and a running support portion that supports running of the vehicle, wherein a control condition for running support control performed by the running support portion is changed on the basis of an evaluation whether the same object has been detected by (i) only the first object detecting portion, (ii) only the second object detecting portion, or (iii) both the first object detecting portion and the second object detecting portion; and wherein a probability that the object exists is calculated to be the highest when both the first object detecting portion and the second object detecting portion detect the object, the next highest when only one of the first object detecting portion or the second object detecting portion detects the object, and the lowest when neither the first object detecting portion nor the second object detecting portion detects the object, and the control condition is changed in accordance with the calculated probability.

2. The running support system for a vehicle according to claim 1, wherein a starting condition for the running support control performed by the running support portion is shifted to a suppression side in the order of (i) a case where an object has been detected by only the first object detecting portion, and (ii) a case where an object has been detected by only the second object detecting portion, as compared to a case where an object has been detected by both the first object detecting portion and the second object detecting portion.

3. A running support system for a vehicle according to claim 1, further comprising an inattentive condition detecting portion that detects whether a driver is performing inattentive driving, wherein a control condition for running support control performed by the running support portion is changed also based on an inattentive condition of the driver detected by the inattentive condition detecting portion.

4. The running support system for a vehicle according to claim 3, wherein, when the same obstacle has been detected by both the first object detecting portion and the second object detecting portion, and the inattentive condition detecting portion has determined that the driver is performing inattentive driving, a starting condition for the running support control performed by the running support portion is shifted to a promotion side, as compared to a case where the driver is not performing inattentive driving.

5. The running support system for a vehicle according to claim 4, wherein the running support portion performs at least one of follow-up running control, adaptive cruise control, obstacle alarm control, and collision shock reducing control.

6. The running support system for a vehicle according to claim 3, wherein, when an obstacle, which has been detected by the first object detecting portion, cannot be detected by the second object detecting portion, and the inattentive condition detecting portion has determined that the driver is performing inattentive driving, a starting condition for the running support control performed by the running support portion is shifted to a promotion side, as compared to a case where the driver is not performing inattentive driving and the same obstacle has been detected by both the first object detecting portion and the second object detecting portion.

7. The running support system for a vehicle according to claim 6, wherein shifting of the starting condition of the running support control, which is performed by the running support portion, to the promotion side is performed by making an amount of shift of a starting condition for running support control, in which there is less necessity for high accuracy in detection of an obstacle in the lateral direction, larger than an amount of shift of a starting condition for running support control, in which there is greater necessity for high accuracy in detection of an obstacle in the lateral direction.

8. The running support system for a vehicle according to claim 7, wherein the running support control, in which there is less necessity for high accuracy in the detection of an obstacle in the lateral direction, is one of follow-up running control and adaptive cruise control, and the running support control, in which there is greater necessity for high accuracy in the detection of an obstacle in the lateral direction, is one of obstacle alarm control and collision shock reducing control.

9. The running support system for a vehicle according to claim 3, wherein, when an obstacle, which has been detected by the first object detecting portion, cannot be detected by the second object detecting portion, and the inattentive condition detecting portion has determined that the driver is not performing inattentive driving, from among starting conditions for various types of running support control performed by the running support portion, a starting condition for running support control, in which there is greater necessity for high accuracy in detection of an obstacle in the lateral direction, is shifted to a suppression side.

10. The running support system for a vehicle according to claim 9, wherein the running support control, in which there is less necessity for high accuracy in the detection of an obstacle in the lateral direction, is one of follow-up running control and adaptive cruise control, and the running support control, in which there is greater necessity for high accuracy in the detection of an obstacle in the lateral direction, is one of obstacle alarm control and collision shock reducing control.

11. The running support system for a vehicle according to claim 3, wherein the running support portion is one of a follow-up running control device and an adaptive cruise control device, and when an obstacle, which has been detected by the second object detecting portion, has not been detected by the first object detecting portion, one of prohibition and interruption of one of the follow-up running control and the adaptive cruise control is performed.

12. The running support system for a vehicle according to claim 3, wherein the running support portion is a collision shock reducing control device, and when an obstacle, which has been detected by the second object detecting portion, has not been detected by the first object detecting portion, start time for collision shock reducing control is retarded as compared to a normal state.

13. The running support system for a vehicle according to claim 12, wherein, when the inattentive condition detecting portion has determined that the driver is performing inattentive driving, the start time for the collision shock reducing control is retarded by a smaller amount than that in a case where it has been determined that the driver is not performing inattentive driving.

14. The running support system for a vehicle according to claim 3, wherein the running support portion is a collision shock reducing control device, and when an obstacle, which has been detected by the second object detecting portion, has not been detected by the first object detecting portion, contents of collision shock reducing control are changed to those of control for a case where a shock due to a collision is small as compared to a normal state.

15. The running support system for a vehicle according to claim 14, wherein the collision shock reducing control is performed by one of a portion that minimizes an amount of deformation of the vehicle, a portion that secures restraint of a passenger, and a portion that changes a damping force of suspension portion.

16. A running support system for a vehicle according to claim 1, further comprising an inattentive condition detecting portion that detects whether a driver is driving in an inattentive condition based on detection of an orientation of the driver's face, wherein a control condition for running support control performed by the running support portion is changed based on the inattentive condition of the driver detected by the inattentive condition detecting portion.

17. A running support system for a vehicle, comprising:
a radar that detects an object near the vehicle;
a camera that detects the object near the vehicle; and
a vehicle control system that supports running of the vehicle,
wherein a control condition for running support control performed by the vehicle control system is changed on the basis of an evaluation whether the same object has been detected by
(i) only the radar,
(ii) only the camera, or
(iii) both the radar and the camera; and
wherein a probability that the object exists is calculated to be the highest when both the radar and the camera detect the object, the next highest when only one of the radar or the camera detects the object, and the lowest when neither the radar nor the camera detects the object, and the control condition is changed in accordance with the calculated probability.

18. A running support system for a vehicle, comprising:
a first object detecting portion that detects an object near the vehicle using a radar;
a second object detecting portion that detects the object near the vehicle by performing image recognition based on an obtained image of an area near the vehicle;
a running support portion that supports running of the vehicle; and
an inattentive condition detecting portion that detects whether a driver is driving in an inattentive condition based on detection of an orientation of the driver's face;
wherein a control condition for running support control performed by the running support portion changes based on an evaluation of whether the object is detected by
(i) only the first object detecting portion,
(ii) only the second object detecting portion, or
(iii) both the first object detecting portion and the second object detecting portion; and
wherein the control condition for running support control performed by the running support portion changes based on the inattentive condition of the driver detected by the inattentive condition detecting portion.

* * * * *